UNITED STATES PATENT OFFICE.

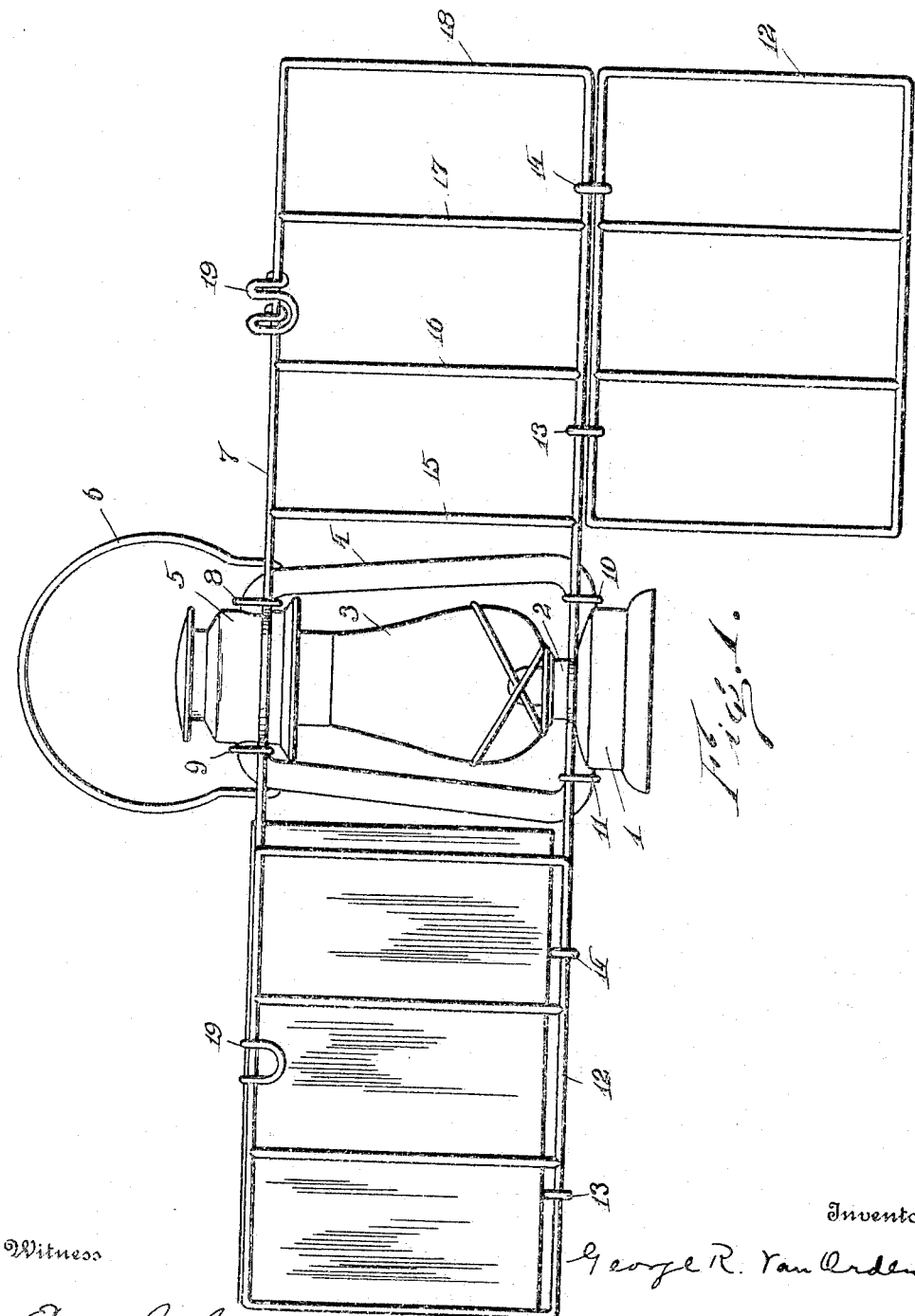

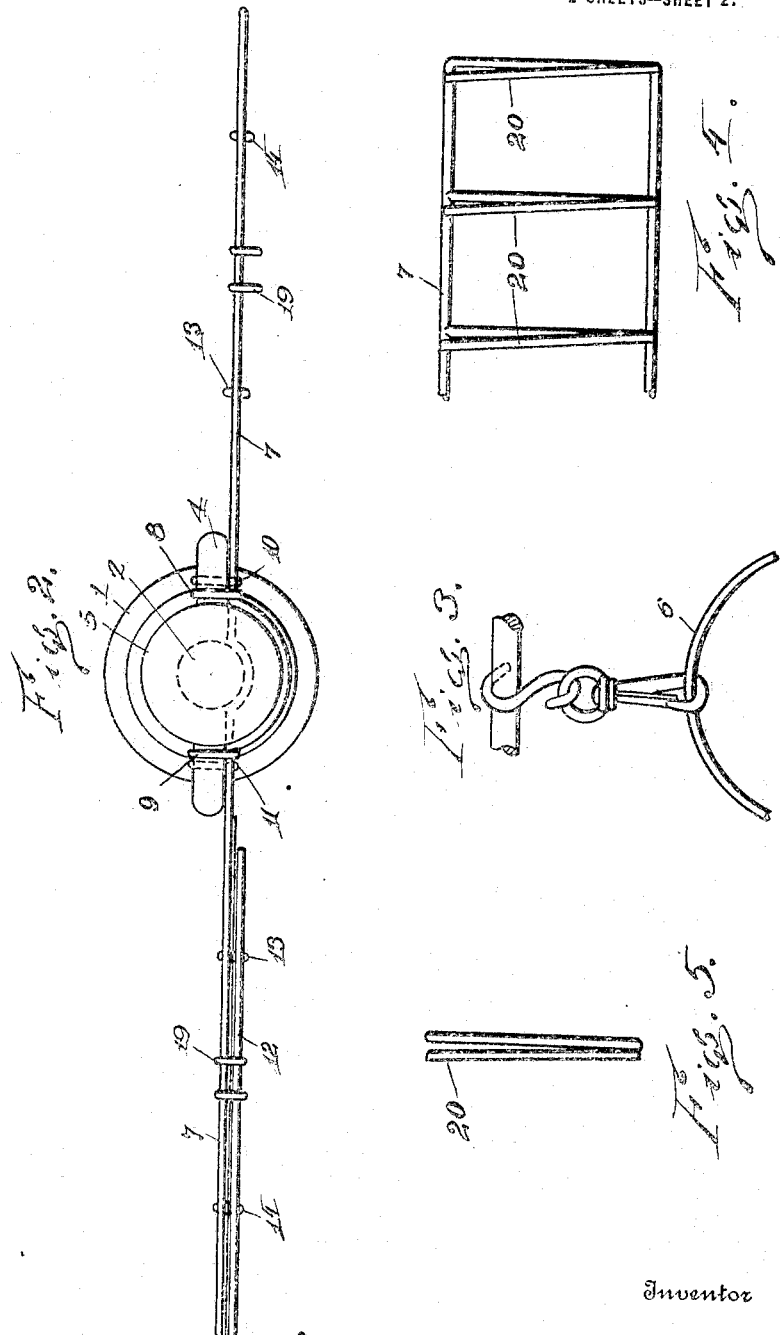

GEORGE R. VAN ORDEN, OF MORTON, NEW YORK, ASSIGNOR OF ONE-HALF TO FRANK KEIPER, OF ROCHESTER, NEW YORK.

INSECT-CATCHER.

1,258,504.

Specification of Letters Patent.

Patented Mar. 5, 1918.

Application filed June 11, 1917. Serial No. 174,124.

*To all whom it may concern:*

Be it known that I, GEORGE R. VAN ORDEN, a citizen of the United States, residing at Morton, in the county of Orleans and State of New York, have invented certain new and useful Improvements in Insect-Catchers, of which the following is a specification.

The object of this invention is to provide a new and improved method and apparatus for killing insects.

Another object of the invention is to provide a lantern with a frame on which an adhesive may be supported for the purpose of catching and destroying insects.

Another object of the invention is to provide a frame for the lantern on which any kind of a surface can be displayed in connection therewith.

These and other objects of the invention will be fully illustrated in the drawings, described in the specification and pointed out in the claims at the end thereof.

In the accompanying drawings,

Figure 1 shows a side elevation of the lantern with the frame attached thereto.

Fig. 2 is a top plan view of the lantern and frame shown in Fig. 1.

Fig. 3 is a detail view of the swivel support for the lantern.

Fig. 4 is a detail view of a modified form of the frame shown in side elevation.

Fig. 5 is an end elevation of the form of frame shown in Fig. 4.

In the drawings like reference characters indicate like parts.

It is well known that fruit trees of all kinds and the fruit they bear suffer very greatly from the attacks of all kinds of insects.

Various measures have been devised to drive the insects away from the trees or to kill the insects and their eggs on the trees and otherwise protect the trees from these pests. Principal among these measures is the practice of spraying the trees with various kinds of solutions which usually destroy only the eggs and leave the parent insects, both male and female, free to breed more eggs and deposit them on the trees.

My invention consists of a new method and apparatus for attracting the insects away from the trees as soon as they are capable of flying and killing them, both male and female, before they can breed and lay their eggs, the insects being induced to furnish the most of the energy that destroys them.

For this purpose I provide a lantern such as is shown in Fig. 1. The lantern here shown is of the ordinary tubular type which has an oil pot 1, a burner 2, a glass globe or chimney 3, a tubular framework 4 and a top 5. Attached to the tubular framework 4 is a bail 6 by which the lantern may be suspended, preferably from a limb of a tree, a swivel hook such as is shown in Fig. 3 being preferably used for this purpose.

It will be understood that any other type of a lantern may be used for this purpose, the lantern itself constituting no part of my invention, it only being necessary that it shine brightly in the dark. It should also throw its light freely in all directions and while burning oil may be used to furnish the light it will be understood that a candle or an electric light or any other source of light may be used instead. The tubular lantern lends itself very nicely to my invention because the framework of the lantern is convenient of form for the purpose of holding the frame which constitutes one of the principal features of my invention which frame can be easily attached to the framework of the lantern as will now be described.

Attached to the framework of the lantern is a rectangular frame or support made preferably of wire, this frame being indicated at 7. This frame is preferably rectangular in form and is attached to the framework of the lantern so that its vertical axis will coincide as nearly as possible with the vertical axis of the lantern and so that the ends of the frame will extend preferably, radially in both directions from the lantern. The attachment of the frame to the lantern is made by bands of wire as indicated at 8, 9, 10 and 11.

The wire of the frame is bent to conform to the shape of the lantern where necessary. To the lower side of each wing of the wire frame 7 may be pivoted a gate 12, it being loosely fastened to the frame 7 by the rings 13 and 14.

The frame 7 on each side of the lantern is braced by the crossbars 15, 16, 17, and 18. On the frame and against these crossbars is placed a sheet of any material coated with an adhesive surface, ordinary sticky fly paper being best suited for this purpose. Each end of the frame is made of such length and breadth as to support a sheet of sticky fly paper or two sheets as may be desired.

A single sheet may be placed on the end of the frame extending lengthwise thereof or two sheets may be placed on the frame, the sheets being placed back to back with their sticky sides outward and exposed after which the gate 12 may be swung up against the frame and locked in place at the top by the catch 19 or by any other suitable device.

The gate 12 may be omitted and the paper may be fastened or supported on the frame in any other suitable way. For this purpose stems 20 may be welded to the frame at the bottom and extend straight up therefrom, the tops of them being left loose as shown in Figs. 4 and 5. One or two sheets of paper can then be placed between the stems and the frame and will be supported thereby. Or the frame could be used alone, in which case the paper could be fastened thereto by spring clothes pins. The frame may be of smaller size and the paper may be doubled over the bottom of the frame being placed crosswise on the frame and the ends thereof may be fastened to the top of the frame, in which case a single sheet of paper will be used which will have a sticky surface exposed on both sides of the frame.

The lantern with its frame so equipped with sticky fly paper is now ready for use and after dark the lantern is lighted and is hung from a limb of a fruit tree for the purpose of killing the flying insects that may be thereon and on the neighboring trees.

It is well known that insects of all kinds are attracted by a light at night and they will fly to the light and around it and even into a burning flame. It is sufficient for the purpose of my invention for the light to attract the insects because when the insect reaches the lantern and tries to fly around it, it will fly against one of the sticky surfaces and be caught thereon.

For this purpose the paper should be supported by the frame as nearly as possible in a position radial to the light so that it will cast little or no shadow and offer no obstruction to the rays of light that attract the insects and offer the greatest possible obstruction to the insects as they fly around the light.

As fast as one sheet of paper fills up with the insects it can be removed and another fresh sheet can be put in its place.

I claim:

1. In an insect catcher, the combination of a lantern having a frame, a frame attached to the lantern frame at the top and bottom thereof, having wings extending substantially radially from opposite sides thereof, said wings each being capable of holding an adhesive surface in substantially a vertical position radially to the light and in the path of the insects as they fly around the light.

2. In an insect catcher, the combination of a lantern having a frame, a frame attached to the lantern frame at the top and bottom thereof, having wings extending substantially radially from opposite sides thereof, said wings each being capable of holding an adhesive surface in substantially a vertical position radially to the light and in the path of the insects as they fly around the light, a gate pivoted to the bottom of each of said wings and adapted to swing up against the frame for the purpose of holding a sheet of paper between the gate and the frame.

3. In an insect catcher, the combination of a lantern having a frame, a frame attached to the lantern frame at the top and bottom thereof, having wings extending substantially radially from opposite sides thereof, said wings each being capable of holding an adhesive surface in substantially a vertical position radially to the light and the path of the insects as they fly around the light, a bail for supporting said lantern, permitting said lantern and the frame attached thereto to swing freely together thereon.

4. In an insect catcher, the combination of a lantern having a frame, means supported by the lantern and comprising a plane extension extending substantially radially from the side thereof, said extension being capable of holding an intercepting surface in an upright position substantially radial to the light and in the path of the insects as they fly around the light.

5. In an insect catcher, the combination of a lantern having a frame, a support attached to the lantern frame at the top thereof and comprising a plane extension extending substantially radially from the side thereof, said extension being capable of holding an adhesive surface in substantially a vertical position radial to the light and in the path of the insects as they fly around the light.

6. In an insect catcher, the combination of a lantern having a bail adapted to suspend the lantern from a support, a support for adhesive material adapted to be attached to the lantern, said support having extensions extending substantially radially from the opposite sides thereof, each of said extensions being capable of holding an intercepting surface in an upright position, substantially radial to the light and in the path of the insects as they fly around the light.

7. In an insect catcher the combination of a lantern, including a bail, a detachable frame for said lantern having a cross bar at the top thereof, means for fastening said cross bar in a horizontal position adjacent to and parallel to said bail, said frame comprising a plane extension extending substantially radially from the side of the lantern, said extension being capable of holding an adhesive surface in substantially a vertical position radially to the light and in the path of the insects as they fly around the light.

In testimony whereof I affix my signature in the presence of two witnesses.

G. R. VAN ORDEN.

Witnesses:
 GERTRUDE HOFFMAN,
 MARION JERMYN.